(12) United States Patent
Sarin et al.

(10) Patent No.: US 7,755,517 B2
(45) Date of Patent: Jul. 13, 2010

(54) NAVIGATION DEVICE (75) Inventors: Raman K. Sarin, Redmond, WA (US); Andrew D. Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/471,009

(22) Filed: Jun. 20, 2006

(65) Prior Publication Data
US 2007/0290837 A1    Dec. 20, 2007

(51) Int. Cl.
*G08G 1/123* (2006.01)
(52) U.S. Cl. ...................................... 340/988; 701/224
(58) Field of Classification Search ................ 340/988, 340/995.27, 995.13, 995.26, 539.11, 539.13; 701/201, 224
See application file for complete search history.

(56) References Cited

U.S. PATENT DOCUMENTS

| 4,852,012 | A  | * | 7/1989  | Suyama ...................... 701/224 |
| 5,021,962 | A  | * | 6/1991  | Helldorfer et al. ........... 701/224 |
| 5,646,856 | A  | * | 7/1997  | Kaesser ....................... 701/224 |
| 5,821,880 | A  | * | 10/1998 | Morimoto et al. ............ 701/224 |
| 6,175,801 | B1 | * | 1/2001  | Millington ................... 701/224 |
| 6,202,023 | B1 | * | 3/2001  | Hancock et al. ............. 701/201 |
| 6,366,856 | B1 | * | 4/2002  | Johnson ....................... 701/224 |
| 6,577,950 | B2 | * | 6/2003  | Shimazu ...................... 701/201 |
| 2005/0288858 | A1 | * | 12/2005 | Amer et al. ................. 701/224 |
| 2006/0190174 | A1 | * | 8/2006  | Li et al. ...................... 701/224 |
| 2006/0253247 | A1 | * | 11/2006 | de Silva et al. .............. 701/201 |

* cited by examiner

*Primary Examiner*—John A Tweel, Jr.

(57) ABSTRACT

A mobile device is provided that includes a position determination mechanism, and a data store of locations including positions for each location. The mobile device is configured to determine its own position and, based on the position of the mobile device, which location is preferred. Upon that determination, the mobile device is configured to orient a pointer in the direction of the preferred location such that a user can move in the direction of the pointer and ultimately arrive at the preferred location.

19 Claims, 5 Drawing Sheets

NAVIGATION DEVICE

BACKGROUND

Blaise Pascal once said "if I had more time, I would have written a shorter letter." It is often easier to make something complex than to keep it simple. This paradox is alive and well in today's technological gadgetry. As technology evolves, it seems developers and perhaps consumers have accepted that each new product should be more complex than the one prior. Today people walk around with tiny little devices in their pocket, like cell phones, that have perhaps more computing power than what put man on the moon, yet few can actually use even a fraction of the capability of those devices. What is missing from life is something useful, which is also usable.

For example, when someone wants to get somewhere, like a coffee shop, it can be frustrating to have a powerful laptop computer or pocket PC that can calculate pi to thousands of decimal places but which can't find him a cup of coffee. An adequate navigation device has eluded those skilled in the art, until now.

SUMMARY

This summary is provided to introduce a selection of concepts in a simplified form that are further described below in the Detailed Description section. This summary is not intended to identify key features or essential features of the claimed subject matter, nor is it intended to be used to limit the scope of the claimed subject matter.

According to aspects of various described embodiments, implementations are provided for navigating a mobile device to a location. Briefly stated, a mobile device is provided that includes a position determination mechanism, and a data store of locations including positions for each location. The mobile device is configured to determine its own position and, based on the position of the mobile device, which location is preferred. Upon that determination, the mobile device is configured to orient a pointer in the direction of the preferred location such that a user can move in the direction of the pointer and ultimately arrive at the preferred location.

DETAILED DESCRIPTION

Various embodiments are described more fully below with reference to the accompanying drawings, which form a part hereof, and which show specific exemplary implementations for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation, or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Briefly stated, a device is provided for navigating to a location. In one example, the device is configured to always point to the nearest of a plurality of locations, such as the nearest coffee shop of a particular chain or perhaps the nearest gas station.

Figure 1:
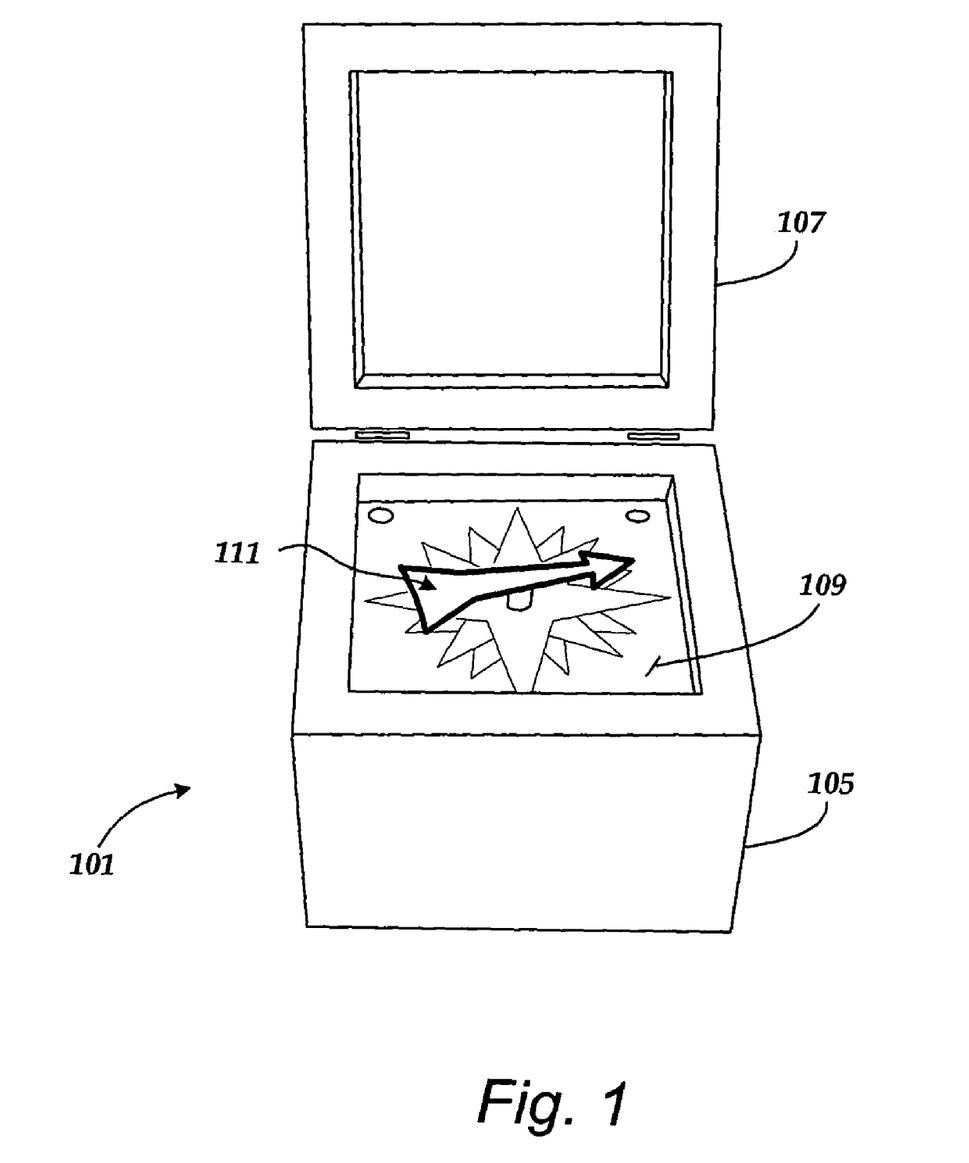
FIG. 1 is an illustration of a sample navigation device that implements one embodiment of the present invention.

FIG. 1 is a graphical illustration of a navigator 101 constructed in accordance with one implementation of the invention. In this embodiment, the navigator 101 has the appearance of an ordinary or conventional compass. The navigator 101 is implemented in a box 105 with a lid 107 that closes over a face 109. The navigator 101 is constructed to resemble a conventional or even antique compass with a pointer 111 that points North. However, in accordance with this embodiment, the pointer 111 of the navigator 101 does not point North. Instead, the pointer 111 points to a particular location within a group of predetermined locations.

More specifically, in this particular implementation, the navigator 101 is pre-configured with the positions of a group of locations. The group of locations could include any physical position that can be described in geospatial terms. In this particular implementation, each location of the group of locations is related in some fashion. For instance, each location may be one of many different stores or franchises. In one example, each location may be one coffee house in a chain of coffee houses. The group may include all or many coffee houses in the chain. In this example, the navigator 101 may be pre-configured with the locations of each of the coffee houses in the chain of coffee houses. Of course, many other examples will become apparent to those skilled in the art.

The navigator 101 of this embodiment is configured to point, when active, in the direction of a preferred location in the group of locations. In one implementation, the navigator 101 is configured to continually point in a direction that will lead a user to the nearest of the locations in the group of locations. In one specific example, the navigator 101 is configured to point to the nearest coffee house if the group of locations includes the positions of each coffee house in a chain of coffee houses. Of course, the navigator 101 could be configured to point to the nearest or most preferred of any number of different locations, such as coffee houses, restaurants, movie theaters, retail stores, discount stores, malls, gas stations, bowling alleys, knocking shops, nightclubs, police stations, fire stations, hospitals, landmarks, libraries, places of religious worship, or the like.

In this way, the navigator 101 may be used as a simple navigation tool to find the nearest or most preferred of a group of locations. In contrast to conventional devices, the navigator 101 in accordance with this embodiment, is a simple device with a limited purpose. In this way, a user will not be confused about how the device works, whether the device is properly configured, whether the device is being properly used, or the like. Rather, the user can simply walk, drive, or otherwise move in the direction pointed to by the pointer 111, and the user will ultimately reach the appropriate destination, such as the nearest of the user's favorite coffee houses. Large chains or franchise owners could use devices constructed in accordance with this embodiment as promotional items, or the like. An entity or enterprise with several locations may provide devices such as described here to its customers or perhaps employees.

Figure 2:
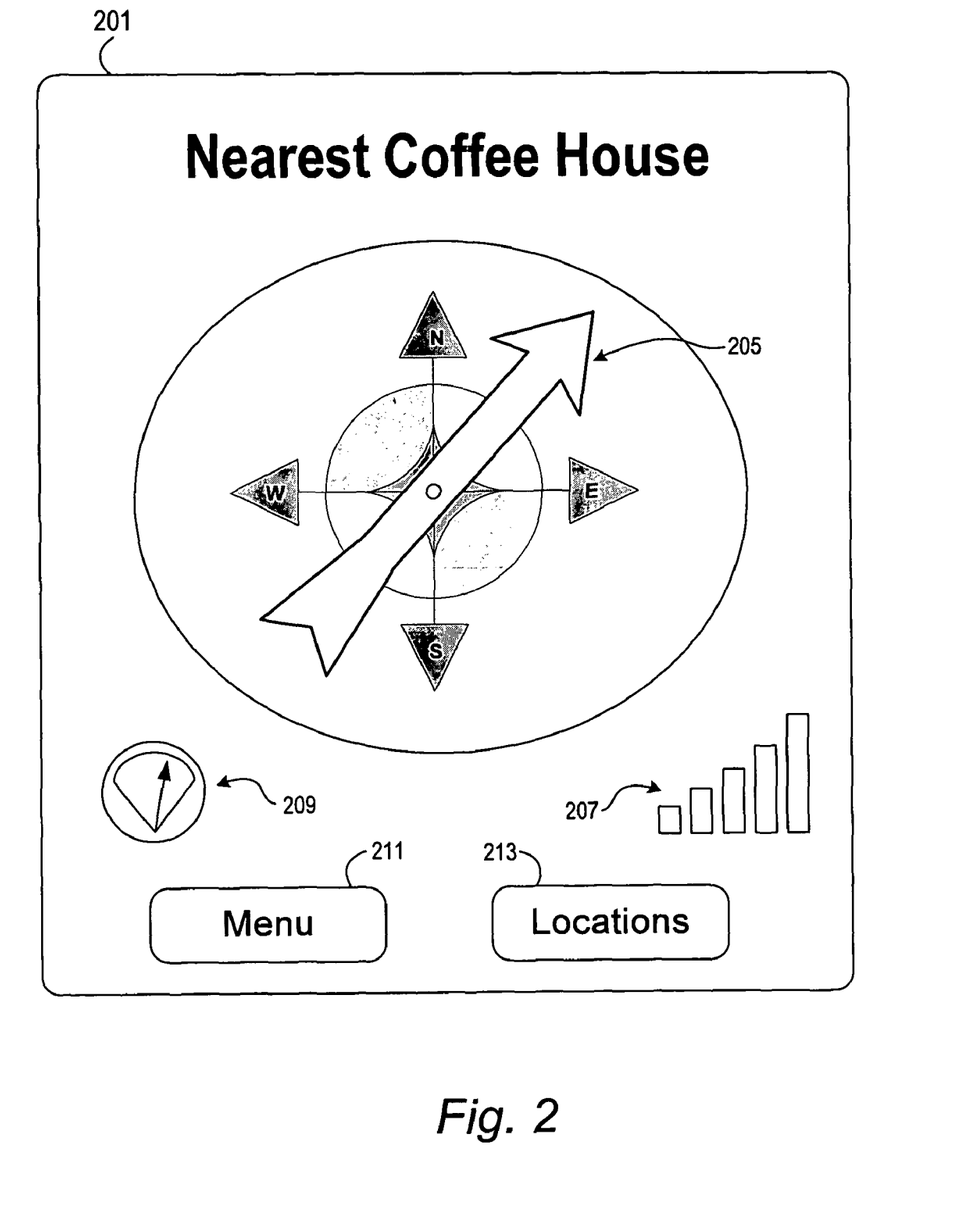
FIG. 2 illustrates one sample implementation of a display for a navigation device that implements one embodiment of the present invention.

FIG. 2 is a sample graphical interface generally illustrating one implementation of an embodiment of the invention. In this embodiment, a display 201 includes a pointer 205. In one implementation, the display 201 is a hardware or mechanical device that is controlled by drive components. In another implementation, the display 201 is graphically simulated such as on a computer screen or the screen of a small handheld device, such as a laptop computer, a handheld computer, a cellular phone, or a small special purpose electronic device having a graphical display.

The pointer 205 may be either an actual mechanical pointer or a virtual pointer represented on an electronic graphical display. As will be described in greater detail below, the pointer 205 is movable on the display 201 such that it always, while active, points in the direction of a preferred location. The display 201 may additionally include other features for graphically demonstrating information other than a direction to a location. For example, a series of LEDs 207 or a gauge 209 may be included to illustrate the distance to the preferred location. While helpful, these other features are not necessary to a proper functioning of this embodiment of the invention.

The display 201 may include arbitrary graphical indicia, such as directional indicia that identify directions like North and South. In such a case, there may or may not be an actual connection between the directional indicia and the actual directions. Alternatively, the display 201 may be adorned with other graphics or the like. In one example, the display 201 may be configured to display a picture or other image that represents the preferred location or something similar. For instance, the device may be configured such that as the device comes near the preferred location, the display 201 changes to include an image of the preferred location to assist the user to find it. Similarly, as the device nears the preferred location or random locations, the display 201 could be transformed to some promotional image or likeness, such as a coupon or the like. The graphical indicia are unnecessary to a proper functioning of embodiments of the invention, but may be included for visual effect, appeal, personalization, advertising, or the like.

The display 201 could additionally and optionally include other features that give access to non-directional information. For instance, in certain implementations there may be user-configurable options. In such a case, a menu selection item 211 could be included to provide a user access to those configurable options. In other implementations, user may be able to select an active group of locations from among a plurality of groups of locations. In such a case, a location selection item 213 could be included in the display 201 to provide the user access to a location selection menu. In one simple implementation, the location selection item 213 could be a simple list of location groups that the user could choose among, perhaps even mechanically by turning a knob or flipping a switch.

The display 201 illustrated in FIG. 2 is but one of many different ways of presenting directional information to a user. In keeping with the teachings of this embodiment, simplicity suggests that any unnecessary components be eliminated from the display 201 so as to minimize the risk of confusion for the user. However, in alternative implementations, the display 201 could be populated with additional information or even, for example, advertising.

Figure 3:
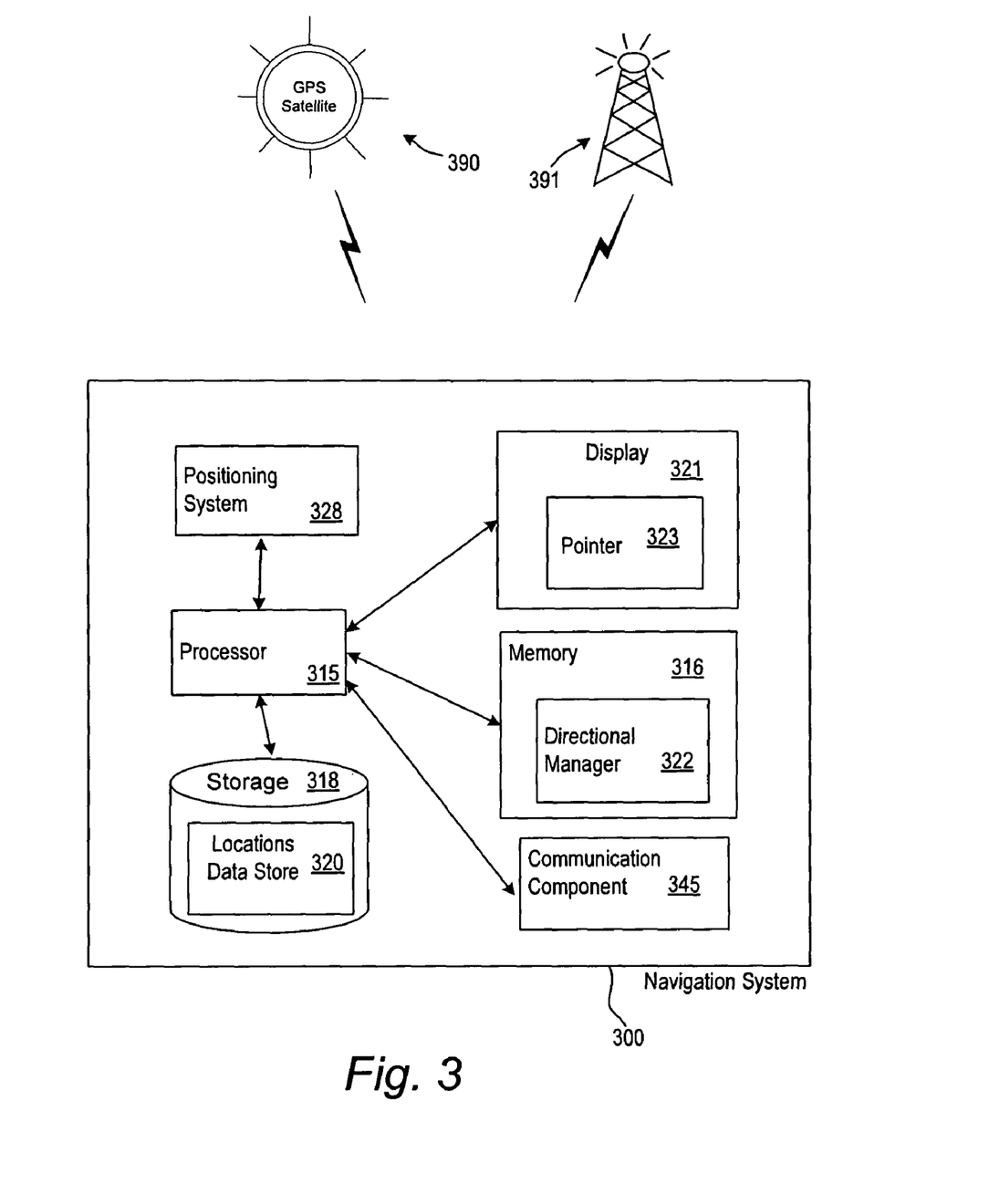
FIG. 3 is a functional block diagram generally illustrating components of a system for implementing one illustrative navigation device in accordance with one embodiment of the invention.

FIG. 3 is a functional block diagram generally illustrating components of a system 300 for implementing one embodiment of the invention. The system 300 may be implemented in a special purpose device useful for navigating to a location in a group of locations. In another implementation, the system 300 may be incorporated into a mobile computing system, pocket PC, smart phone, or cellular telephone. These and other implementations will become apparent to those skilled in the art. The system 300 may be executed on a computing platform, such as that described below in conjunction with FIG. 4.

The system 300 includes a processor 315, which may be a digital signal processor, a microprocessor, a central processing unit, an Application Specific Integrated Circuit (ASIC), Programmable Logic Array (PLA) or the like. The processor 315 is responsible for executing each of the other computer-executable components of the system 300. It should be noted that the processor 315 is illustrated as a single item for simplicity of discussion only, and the functions performed by the processor 315 could be divided among different processors or a processor and other components.

The system 300 also includes a positioning system 328 which is configured to determine where, in geospatial terms, the system 300 is. More specifically, the positioning system 328 determines both position and orientation of the system 300. The positioning system 328 may include components that implement a Global Positioning Satellite (GPS) receiver, for example. In such a case, the positioning system 328 may receive signals from one or more GPS satellites 390 to determine the position of the system 300. Alternatively, the positioning system 328 may receive signals from one or more cellular towers 391 embedded with positioning information. In addition, the positioning system 328 may also include components or functionality to determine an orientation of the system 300. In other words, the positioning system 328 can determine which direction is North, for example. Examples of the types of components or functionality that may be used include a conventional or magnetic compass, electronic compass, gyroscope, combinations of these or other components, and the like.

Data may be stored on a data storage component (storage 318), such as a hard drive, a flash memory module, a Read Only Memory (ROM) module, or the like. In this particular implementation, the storage 318 includes a locations data store 320 in which resides information about the positions of each of a group of locations. The locations data store 320 may include database records or tabular data that identifies each location in a group of locations. As mentioned above, the locations can be any place having a physical presence. In one specific example, each location may be a coffee house or the like. The information about each location includes, at least, geospatial data that specifies where the location is. In one example, latitude and longitude data is provided for each location. In addition, elevation data could also be provided. The positions could be specified in many alternative coordinate systems without deviating from the spirit of the invention. In certain other implementations, the location data could include pictures or other images of each location, perhaps for the purpose of displaying those pictures or images as the device 300 nears the corresponding locations.

In various embodiments, the storage 318 may be upgradeable, replaceable, or otherwise modifiable to include a latest version of the locations data store 320 or perhaps alternative locations data stores (e.g., for other groups of locations). In such an implementation, a "current locations data store" may be user selectable programmatically, such as with a user interface, or perhaps mechanically, such as with a knob or other switch.

In embodiments that are upgradeable, the system 300 may include a communication component 345, such as wired or wireless network connectivity components, for importing and/or outputting data between the system 300 and other devices, such as a conventional computer system. In such an embodiment, new location data may be retrieved using the communication component 345 and stored in the storage 318. In certain implementations, usage or travel data may be stored on the system 300, such as those locations which the system 300 has visited (e.g., been within some predetermined distance of), and transmitted over the communication component 345 to a data collection entity or device, such as a general purpose computer system. Alternatively, usage data may be collected at the visited location itself rather than on the system 300.

In embodiments that include the communication component 345, usage or travel data could be collected by the locations visited. For example, systems (not shown) implemented at a particular location that the system 300 visits may receive transmissions from the communication component 345 to inform the location that the system 300 has visited. This usage information could be tracked either with or without personally identifiable information about the system 300, so as to optionally protect the privacy of the user of the system 300. This usage or travel data could then be aggregated and used in market analysis or for other purposes.

In still other embodiments that include the communication component 345, new data may include area-specific location data. For example, in certain implementations the device 300 may be configured to interact with a remote "area server" or the like to download, via the communication component 345, location data for a group of locations in the area. In one specific example, a user of the device 300 may enter a certain geographic area like a new city. As the user nears the area server, which could be one of the locations in the area, the device 300 could interact with that area server to download location data specific to that area and store that new area-specific location data in the locations data store 320. In addition, the device 300 could be further configured to "swap out" or perhaps simply cull location data from the locations data store 320 for any locations that the device 300 has never been near or not been near for a given length of time.

The system 300 includes a display 321 for outputting directional information. In one example, the display 321 may take substantially the same form as the display 201 illustrated in FIG. 2 and described above. Alternatively, the display 321 can take any one of many other forms. However, the common feature of the many different forms of the display 321 is a pointer 323. The pointer 323 may be a software generated virtual pointer, such as may be rendered on a graphical display. Alternatively, the pointer 323 could be a software-controlled hardware device.

Each of the executable components of the system 300 may reside and execute in a system memory 316, under control of the processor 315. For instance, in this particular implementation a directional manager 322 resides and executes in the memory 316. The directional manager 322 is a component that is configured to interact with each of the other components to provide the navigational functionality of the system 300. In other words, the directional manager 322 determines the system's current position and orientation from the positioning system 328. The directional manager 322 compares the system's current position to the positions of locations as defined in the locations data store 320 to determine a preferred location. The preferred location could be the nearest location of the group of locations. Alternatively, the preferred location could be one of the nearest locations taking in to account certain weighting factors that may be attached to each location.

Using the current position of the system 300, the orientation of the system 300, and the direction to the preferred location, the directional manager 322 calculates and/or determines an orientation for the pointer 323 on the display 321. The directional manager 322 is configured to repeat this procedure based on a predetermined interval, perhaps for so long as the system 300 is active, to constantly update the orientation of the pointer 323 on the display 321. In this way, the directional manager 322 is capable of keeping the pointer 323 pointing in the direction of the preferred location as the system moves, such as while a user walks or otherwise moves the system 300 toward the preferred location.

The system 300 could also include mapping data (not shown) that the directional manager 322 could use to constantly re-compute a route from the current position of the system 300 toward the preferred location. In other words, the directional manager 322 could compare the position and orientation of the system 300 to mapping data (not shown) so as to orient the pointer 323 in a direction along a computed route toward the preferred location, which may not always point directly at the preferred location (e.g., "wayfinding"). In such an implementation, the display 321 could include two pointers 323, one pointer for a direct "line-of-sight" indication and another pointer as a wayfinder. This and other alternatives will become apparent to those skilled in the art.

Figure 4:
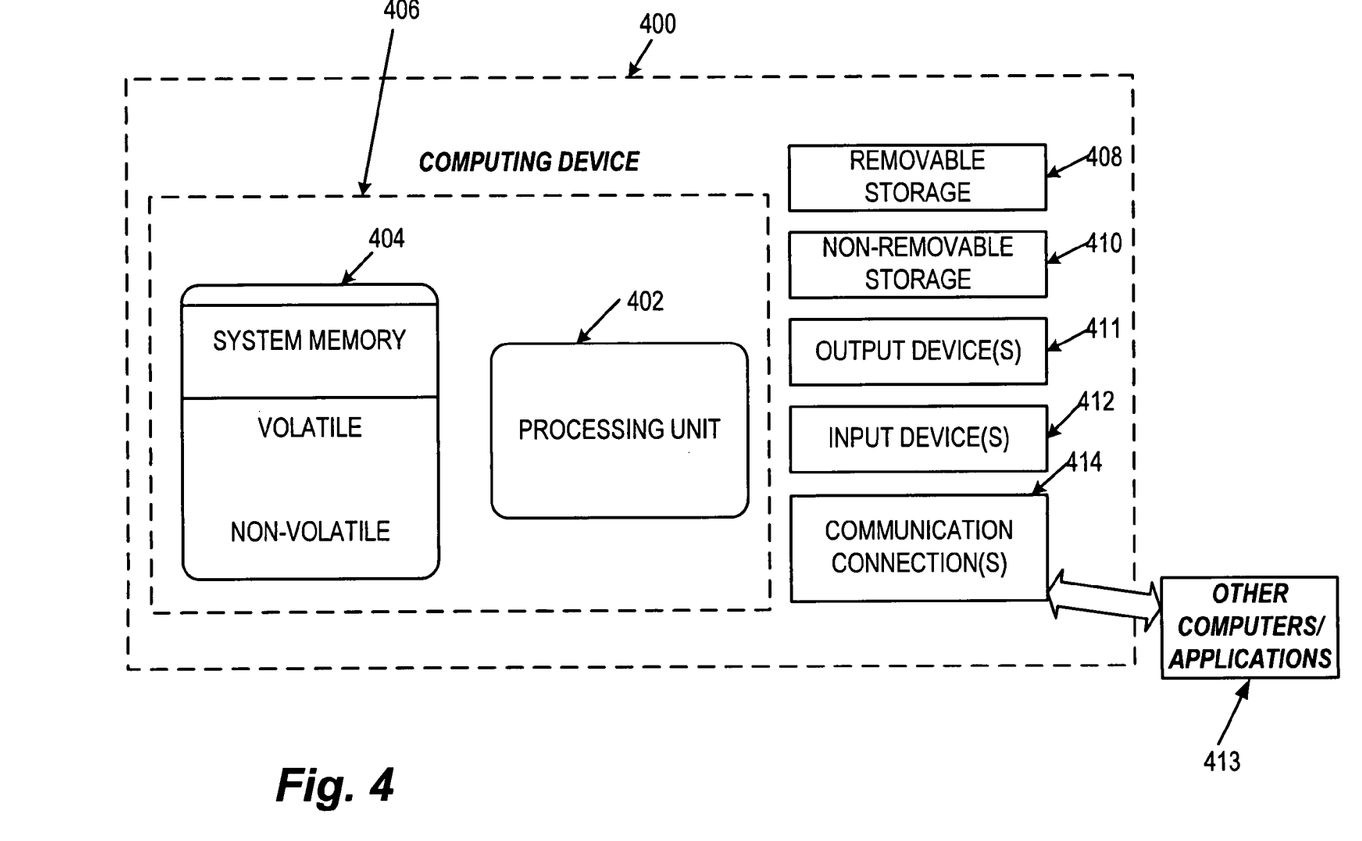
FIG. 4 is a functional block diagram generally illustrating components of a computing environment which may be used to implement certain embodiments of the invention, such as the embodiment illustrated FIG. 3.

FIG. 4 is a functional block diagram generally illustrating components of a computing environment which may be used to implement certain embodiments of the invention, such as the embodiment described above in conjunction with FIG. 3. A computing device 400, in one basic configuration, includes at least a processing unit 402 and memory 404. Depending on the exact configuration and type of computing device, memory 404 may be volatile (such as RAM), non-volatile (such as ROM, flash memory, etc.) or some combination of the two. This most basic configuration is illustrated in FIG. 4 by dashed line 406.

Device 400 may also have additional features and functionality. For example, device 400 may also include additional storage (removable and/or non-removable) including, but not limited to, magnetic or optical disks or tape. Such additional storage is illustrated in FIG. 4 by removable storage 408 and non-removable storage 410. Computer storage media includes volatile and nonvolatile, removable and non-removable media implemented in any method or technology for storage of information such as computer readable instructions, data structures, program modules or other data. Memory 404, removable storage 408 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 400. Any such computer storage media may be part of device 400.

Computing device 400 includes one or more communication connections 414 that allow computing device 400 to communicate with one or more computers and/or applications 413. Computing device 400 may also have input device(s) 412 such as keyboard, mouse, pen, voice input device, touch input device, etc. Output device(s) 411 such as a monitor, speakers, printer, PDA, mobile phone, and other types of digital display 310 devices may also be included. These devices are well known in the art and need not be discussed at length here.

What follows are descriptions of a generalized process that implements various, non-exclusive embodiments of the invention. This process may be implemented using computer-executable instructions in software or firmware, but may also be implemented in other ways, such as with programmable logic, electronic circuitry, or the like. In some alternative embodiments, certain of the operations may even be performed with limited human intervention. Moreover, this process is not to be interpreted as exclusive of other alternative embodiments, but rather is provided as illustrative only.

Figure 5:
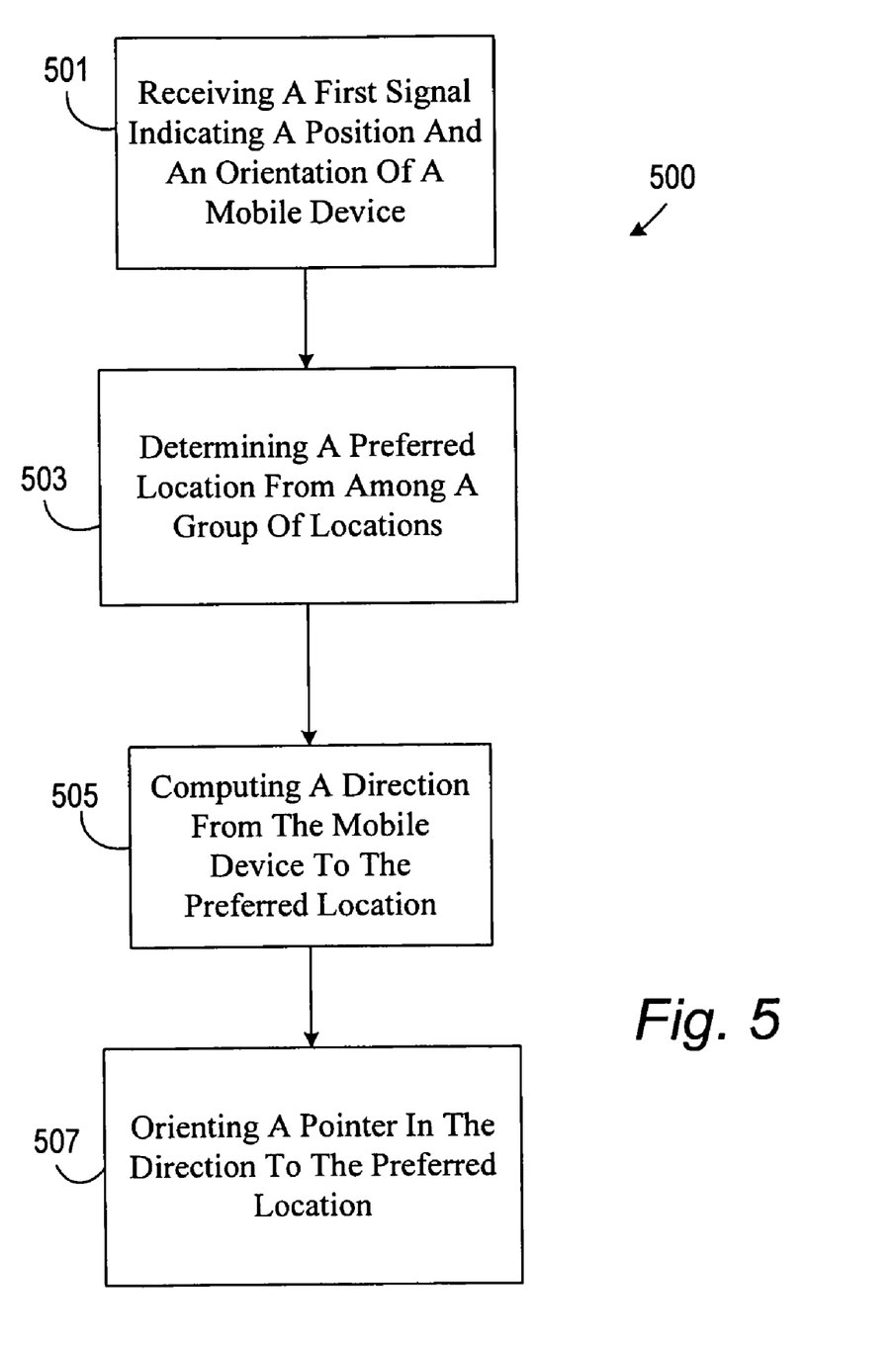
FIG. 5 is an operational flow diagram generally illustrating operations performed in a process for navigating to a location, in accordance with one implementation of the invention.

FIG. 5 is an operational flow diagram generally illustrating operations performed in a process for navigating to a location, in accordance with one implementation of the invention. The process may be performed on a mobile computing device configured in accordance with the embodiments described above, or in accordance with other embodiments suggested by those described above. A description of the process begins at block 501, illustrated in FIG. 5.

At block 501, a first signal is received indicating a position and an orientation of a mobile device. The signal may be received from a positioning system that detects or determines the position and orientation of the mobile device using geospatial positioning detection mechanisms, such as GPS satellite signals, a compass, a gyroscope, and the like.

At block 503, a preferred location is determined from among a group of locations. The preferred location has a position that is stored in association with the preferred location, such as in a locations data store. The position may be described in geospatial terms, such as latitude, longitude, and perhaps elevation. The preferred location may be determined without prompting for manual intervention. For example, in certain implementations, no input from the user is requested prior to determining which of the locations is preferred, thus further simplifying the operation of the device.

At block 505, a direction from the mobile device to the preferred location is computed. The direction may optionally include a distance.

At block 507, a pointer is oriented in the direction to the preferred location. In one implementation, the pointer is oriented directly toward the preferred location. In another implementation, the pointer may be oriented along a route from the current position of the mobile device to the preferred location.

Although the process shown in FIG. 5 is illustrated and described sequentially with operations occurring in a particular order, in other embodiments, the operations described in the blocks may be performed in different orders, multiple times, and/or in parallel. Further, in some embodiments, one or more operations described in the blocks may be separated into another block, omitted or combined.

There are very many alternative ways to implement the concepts of the invention, all of which the inventors intend as being within the scope of the appended claims. Many such alternatives have been suggested or touched upon above throughout this detailed discussion, and many more, too numerous to enumerate, are equally possible.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A computer-readable medium encoded with computer-executable components for navigating a mobile device to a location, the components comprising:
   a positioning system configured to determine a current position, in geospatial terms, of the mobile device;
   a locations data store in which resides information about positions for each location in a plurality of locations; and
   a directional manager configured to:
   retrieve the current position of the mobile device from the positioning system;
   compare the current position to the positions of the locations in the locations data store to determine, without manual intervention and without user input, which of the plurality of locations is a preferred location; and
   orient a pointer in a direction that leads to the preferred location, wherein the directional manager is further configured to continually update the orientation of the pointer as the mobile device moves and changes current position.

2. The computer-readable medium recited in claim 1, wherein the positioning system is further configured to determine a current orientation of the mobile device.

3. The computer-readable medium recited in claim 1, wherein the locations in the plurality of locations represent a physical place and the position of each location is defined using geospatial terms.

4. The computer-readable medium recited in claim 1, wherein the preferred location is a location nearest the mobile device.

5. The computer-readable medium recited in claim 1, wherein the preferred location is determined by considering weighting factors attached to each location.

6. The computer-readable medium recited in claim 1, wherein the location data store further includes mapping data that describes roadways.

7. The computer-readable medium recited in claim 6, wherein the directional manager is further configured to compute a route along the roadways that leads to the preferred location, and wherein the directional manager is further configured to orient the pointer along the route.

8. The computer-readable medium recited in claim 7, wherein the locations data store includes a second plurality of locations, and wherein the mobile device further includes a selection mechanism that allows a selection of which of the plurality of locations the directional manager should use to determine the preferred location.

9. The computer-readable medium recited in claim 1, wherein the directional manager is further configured to render a image on a display based on the current position of the mobile device, the image being associated with the preferred location, or with any location proximate to the current position, or both.

10. The computer-readable medium recited in claim 1, wherein the locations data store is upgradeable with new information.

11. A navigation device, comprising:
   a positioning system configured to determine a current position, in geospatial terms, and orientation of the navigation device;
   a locations data store in which resides information about positions for each location in a plurality of locations;
   a communication component configured to enable communications between the navigation device and an external system; and
   a system memory in which is executing a directional manager, the directional manager being configured to cause the navigation device to:
      retrieve the current position of the navigation device from the positioning system;
      compare the current position to the positions of the locations in the locations data store to determine, without manual intervention and without user input, which of the plurality of location is a preferred location;
      orient a pointer in a direction that leads to the preferred location; and
      update the locations data store with new information by retrieving the new information using the communication component.

12. The navigation device recited in claim 11, wherein the directional manager is further configured to continually update the orientation of the pointer as the mobile device moves and changes current position.

13. The navigation device recited in claim 11, wherein the directional manager is further configured to render a image on a display based on the current position of the navigation device, the image being associated with the preferred location, or with any location proximate to the current position, or both.

14. The navigation device recited in claim 11, wherein the locations in the plurality of locations represent a physical place and the position of each location is defined using geospatial terms.

15. The navigation device recited in claim 11, wherein the preferred location is a location nearest the navigation device.

16. The navigation device recited in claim 11, wherein the preferred location is determined by considering weighting factors attached to each location.

17. A computer-readable medium encoded with computer-executable instructions for navigating a mobile device toward a destination, comprising:
   receiving a first signal indicating a position and an orientation of the mobile device;
   storing in a location data store information about positions for each location in a plurality of locations;
   comparing the position to the positions of the locations in the data store to determine, without manual intervention and without user input, which of the plurality of locations is a preferred location;
   computing a direction from the mobile device to the preferred location; and
   orienting a pointer in the direction to the preferred location.

18. The computer-readable medium recited in claim 17, wherein the preferred location is a location nearest the mobile device.

19. The computer-readable medium recited in claim 17, wherein the direction to the preferred location is continually updated and the pointer is continually re-oriented as the mobile device moves.

* * * * *